US012209388B2

(12) United States Patent
Young et al.

(10) Patent No.: US 12,209,388 B2
(45) **Date of Patent: *Jan. 28, 2025**

(54) SYSTEM AND METHODS FOR CYCLE TIME MANAGEMENT

(71) Applicant: Doosan Bobcat North America, Inc., West Fargo, ND (US)

(72) Inventors: Charles Young, Bismarck, ND (US); Marty Carpenter, Bismarck, ND (US); Scott Becker, Bismarck, ND (US); Douglas Kallas, Mandan, ND (US); Matthew Kaldor, Bismarck, ND (US); Eric Zabel, Bismarck, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,145

(22) Filed: Oct. 25, 2023

(65) Prior Publication Data

US 2024/0052596 A1 Feb. 15, 2024

Related U.S. Application Data

(63) Continuation of application No. 17/948,544, filed on Sep. 20, 2022, now Pat. No. 11,834,810, which is a continuation of application No. 17/030,836, filed on Sep. 24, 2020, now Pat. No. 11,447,930.

(60) Provisional application No. 62/904,860, filed on Sep. 24, 2019.

(51) Int. Cl.

| | |
|---|---|
| ***E02F 9/22*** | (2006.01) |
| ***E02F 9/20*** | (2006.01) |
| ***F15B 11/05*** | (2006.01) |

(52) U.S. Cl.

CPC .......... *E02F 9/2203* (2013.01); *E02F 9/2029* (2013.01); *E02F 9/2232* (2013.01); *E02F 9/2235* (2013.01); *E02F 9/2296* (2013.01); *F15B 11/055* (2013.01)

(58) Field of Classification Search

CPC ....... F15B 11/05; F15B 11/055; F15B 11/161; F15B 11/165; E02F 9/2203; E02F 9/2232; E02F 9/2235; E02F 9/2296

See application file for complete search history.

(56) References Cited

U.S. PATENT DOCUMENTS

| | | | |
|---|---|---|---|
| 4,649,705 | A | 3/1987 | Williamson |
| 5,630,317 | A | 5/1997 | Takamura |
| 7,555,898 | B2 | 7/2009 | Wada |
| 7,832,208 | B2 | 11/2010 | Peterson |

(Continued)

FOREIGN PATENT DOCUMENTS

| | | |
|---|---|---|
| JP | 2011047317 A | 3/2011 |

OTHER PUBLICATIONS

International Searching Authority. International Search Report and Written Opinion for corresponding application PCT/US2020/052430. Mailed on Feb. 22, 2021. 13 pages.

*Primary Examiner* — Michael Leslie

(74) *Attorney, Agent, or Firm* — Quarles & Brady, LLP

(57) ABSTRACT

A hydraulic work system can include a continuously variable displacement hydraulic pump that is powered by an engine and is in communication with a hydraulic actuator. A run-time displacement of the hydraulic pump for movement of the hydraulic actuator can be controlled based on a speed of the engine.

20 Claims, 6 Drawing Sheets

(56) References Cited

U.S. PATENT DOCUMENTS

| | | | | |
|---|---|---|---|---|
| 8,429,908 | B2 | 4/2013 | Bauer | |
| 8,594,896 | B2 | 11/2013 | Nicholson | |
| 8,924,100 | B2 | 12/2014 | Imura | |
| 9,234,587 | B2 | 1/2016 | Cover | |
| 9,605,414 | B2 | 3/2017 | Yamada | |
| 9,796,571 | B2 | 10/2017 | Singh | |
| 10,017,912 | B2 | 7/2018 | Singh | |
| 10,029,897 | B2 * | 7/2018 | Guarino | B66F 9/22 |
| 10,208,458 | B2 * | 2/2019 | Shin | F15B 11/055 |
| 10,227,997 | B2 | 3/2019 | Hijikata | |
| 11,447,930 | B2 * | 9/2022 | Young | F15B 11/055 |
| 11,834,810 | B2 * | 12/2023 | Young | E02F 9/2203 |
| 2018/0119390 | A1 | 5/2018 | Hewitt | |
| 2018/0238025 | A1 | 8/2018 | Imura | |
| 2018/0258615 | A1 | 9/2018 | Xing | |
| 2018/0355583 | A1 | 12/2018 | Moriki | |
| 2019/0000003 | A1 | 1/2019 | Brooks | |
| 2019/0032306 | A1 | 1/2019 | Jimbo | |

* cited by examiner

SYSTEM AND METHODS FOR CYCLE TIME MANAGEMENT

CROSS-REFERENCE TO RELATED APPLICATIONS

This application claims priority to U.S. Provisional Patent Application No. 62/904,860, U.S. patent application Ser. No. 17/030,836, and U.S. patent application Ser. No. 17/948,544, titled "System and Methods for Cycle Time Management" and filed Sep. 24, 2019, Sep. 24, 2020, and Sep. 20, 2022, respectively, the entireties of which are incorporated herein by reference.

BACKGROUND

This disclosure is directed toward power machines. More particularly, this disclosure relates to hydraulic systems such as systems for hydraulic lift and tilt functions for work elements of power machines. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Conventional power machines can include an engine that powers certain hydraulic systems via a constant displacement pump, thus providing a constant hydraulic flow rate to the hydraulic system for a given engine speed. Accordingly, rotational speed at an input shaft for the pumps must be increased to provide an increased hydraulic flow rate, and speed at the input shaft must be decreased to provide a decreased hydraulic flow rate.

The discussion above is merely provided for general background information and is not intended to be used as an aid in determining the scope of the claimed subject matter.

SUMMARY

Some embodiments of the present disclosure provide systems (and corresponding methods) to control cycle time of lift arms and other hydraulic functions for a power machine. In some embodiments, a cycle time control system can be configured to adjust a hydraulic flow rate (e.g., a flow rate range) for a hydraulic pump based on a speed of the engine to maintain a target flow rate for the pump and, correspondingly, to provide a target cycle time for certain hydraulic functions. In some embodiments, a cycle time control system can also be configured to set a hydraulic flow rate (e.g., a flow rate range) based on various operational parameters of the power machine, such as a current travel speed or acceleration of the power machine, a movement profile of a work element of the power machine, an orientation (e.g., angular incline) of the power machine or an implement thereof, or a size or weight of a payload received by a work element of the power machine.

Some embodiments provide a power machine that includes a frame, and a lift arm pivotally mounted to the frame. A hydraulic actuator can be coupled to the frame and to the lift arm and can be actuable to move the lift arm relative to the frame. A hydraulic system can include a pump in communication with the hydraulic actuator, the pump being powered by an engine and being configured to operate with continuously variable displacement to provide a hydraulic flow to the hydraulic actuator. A control device can be configured to: determine an engine speed value; and control a run-time displacement of the pump, based on the determined engine speed value, to maintain a target hydraulic flow rate from the pump to cause the hydraulic actuator to move the lift arm from a fully lowered position to a fully raised position over a target duration of time.

Some embodiments provide a method for controlling operation of a power machine. A pump of a hydraulic system can be operated, using power from an engine of the power machine, to provide hydraulic flow to execute hydraulic work functions, the pump being configured to operate with continuously variable displacement to provide the hydraulic flow. An engine speed value can be determined, using a control device. Using the control device, a run-time displacement of the pump can be controlled based on the determined engine speed value, to provide hydraulic flow to execute at least one of the hydraulic work functions.

Some embodiments provide a hydraulic work system for use in a power machine with an engine. A hydrodynamic work actuator circuit can include a pump that is configured to provide hydraulic flow to execute hydraulic work functions, the pump being powered by the engine and being configured to operate with continuously variable displacement to provide the hydraulic flow. A control device can be configured to determine a target maximum hydraulic flow rate based on at least one of: an actual travel speed or acceleration for the power machine, a commanded travel speed or acceleration for the power machine, a loading of an implement associated with at least one of the hydraulic functions, or an orientation of a implement or the power machine. The control device can be further configured to control a run-time displacement of the pump, over a range of engine speeds, to prevent a run-time flow rate of the pump from exceeding the target maximum hydraulic flow rate during execution of at least one of the hydraulic work functions.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

DETAILED DESCRIPTION

Figure 1:
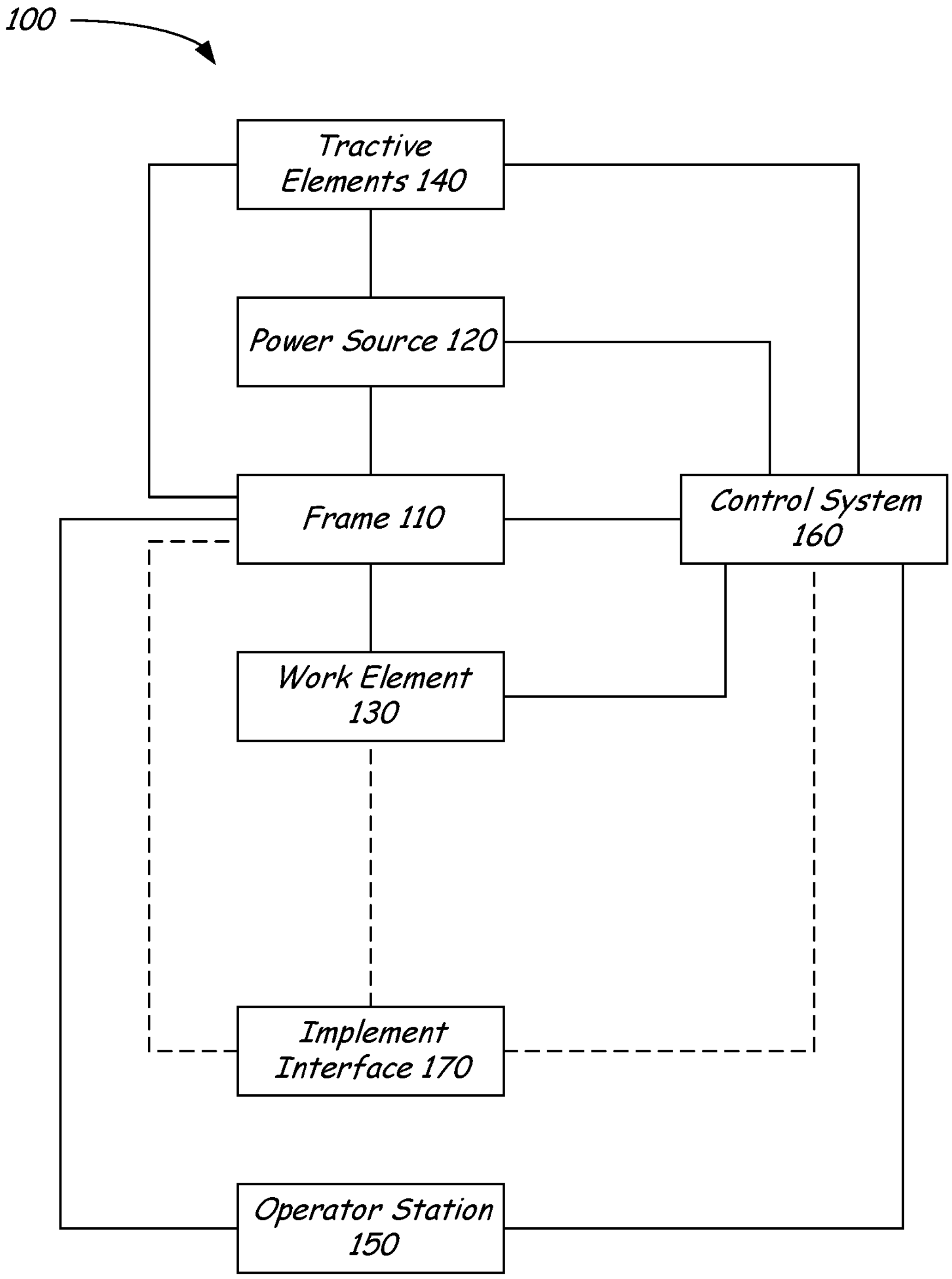
FIG. 1 is a block diagram illustrating functional systems of a representative power machine on which embodiments of the present disclosure can be advantageously practiced.

The concepts disclosed in this discussion are described and illustrated by referring to exemplary embodiments.

These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as “including,” “comprising,” and “having” and variations thereof as used herein are meant to encompass the items listed thereafter, equivalents thereof, as well as additional items.

Unless otherwise specified or limited, “cycle time” according to this disclosure refers to the time required to move a work element of a power machine from a first position to a second position, to move a work element of a power machine from a first position through a series of other positions to return to the first position, or to similarly operate any of a variety of auxiliary (i.e., non-drive) hydraulic systems of a power machine. For example, a cycle time can refer to the time required to move a work element from a fully lowered position to a fully raised position, from fully raised to fully lowered, or from fully lowered to fully raised and then back to fully lowered, and so on.

Power machines (e.g., skid-steer loaders) typically include a power source (e.g., an engine) and hydraulic systems to operate work elements including lift arms that are primarily used to position implements (e.g., buckets) that are operably coupled to the lift arms and actuators that may be integrated onto the implement (generally, the pressurized hydraulic fluid provided to such on the implement actuators is referred to as auxiliary hydraulic flow) or other systems. Thus, for example, an engine can power a pump, which can drive hydraulic flow through a hydraulic system to raise and lower a lift arm or tilt an attached implement, or otherwise operate auxiliary hydraulic operations.

In conventional configurations, hydraulic work actuator circuits can include constant displacement pumps, which provide a constant flow rate for a given input speed (e.g., a speed of an engine powering the pumps). As a result, pump flow may relate directly to engine speed: higher input (e.g., engine) speeds result in higher flow rates within work actuator circuits to operate work elements, implements, or other auxiliary devices, and lower input (e.g., engine) speeds result in lower flow rates.

Direct dependency of flow rate of a pump for work elements or auxiliary devices on the speed of an engine can sometimes result in disadvantages. For example, the flow required by a hydraulic system to operate in a desired manner may be far less than what the pump is supplying, which can lead to sub-optimal performance and unneeded wear on hydraulic components. Further, because the flow rate of hydraulic fluid within a work actuator circuit directly relates to the cycle time of associated work elements (e.g., lift and lower times for lift arms) or other operations, this flow rate can be an important factor for effective and satisfactory execution of different tasks (e.g., lifting materials, etc.). For example, a lift arm that moves too quickly, as actuated by excessive hydraulic flow, can be difficult to control precisely. Accordingly, systems for which flow rates vary based on engine speed may exhibit cycle times that also vary based on engine speed, with potentially unsatisfactory performance.

In still further cases, lack of appropriate control of hydraulic flow for work actuator (or other non-drive) circuits can result in other undesirable effects. For example, when a power machine is traveling at a relatively fast speed, including as may correspond to relatively fast engine speeds, overly fast movement of lift arms or other work elements can reduce overall stability of the power machine. As a further example, overall stability can also be reduced by overly fast movement of lift arms or other work elements while a power machine is traveling on an incline or otherwise inclined relative to a normal orientation. Similar considerations can also apply based on other operational modes, such as, for example, during operations with a loaded implement (e.g., a full bucket).

Embodiments of the disclosure can provide improvements over conventional hydraulic systems, including to address the issues noted above, by providing hydraulic systems (and corresponding methods) that control the cycle time of work elements such as lift arms and that otherwise effectively manage flow rates for hydraulic circuits. In particular, some embodiments can advantageously control displacement of a hydraulic pump based on engine speed, so that the flow rate that can be provided by the pump for a hydraulic operation (e.g., raising and lowering a lift arm) may not necessarily vary with the engine speed. For example, under systems and methods according to some embodiments of the disclosure, a control device such as an electronic or electro-hydraulic controller, can control a continuously variable displacement hydraulic pump over a range of engine speeds to maintain a target cycle time (e.g., a target cycle total time or target cycle time range) for a particular work element or operation or to maintain a target hydraulic flow rate from the pump to a particular hydraulic actuator. For example, if the speed of an engine that powers a hydraulic pump for a work actuator circuit is reduced, displacement of the hydraulic pump can be automatically and proportionally increased so that a target hydraulic flow rate can be maintained at the pump and the work element can still move at a relatively constant speed (i.e., with a relatively constant cycle time). Conversely, if engine speed is increased, displacement of the hydraulic pump can be automatically and proportionally decreased so that a target hydraulic flow rate can still be maintained at the pump and the work element can still move at a relatively constant speed (i.e., with a relatively constant cycle time).

Generally, this automatic control, and other similar control strategies disclosed herein, can help to reduce wasted power generation and system wear, while also maintaining predictability for operations of a work element (e.g., relative to cycle times and implement speeds), with corresponding improvements in operator effectiveness and satisfaction. Correspondingly, some embodiments can provide for operation of power machines with optimized cycle times for certain work functions (e.g., fully raising or fully lowering a lift arm). In some cases, an optimized cycle time may correspond to a smallest possible cycle time (i.e., to fastest possible operation) for a particular implement or operation. In some cases, such as for operators with less experience, operations with tight boundaries or that requires fine spatial control, or operations in certain conditions (e.g., on uneven terrain, with heavily loaded implements, etc.) an optimized cycle time may correspond to a longer cycle time than may be generally possible for a given power machine or implement.

In different embodiments, cycle times for hydraulic operations can be controlled based on different parameters related to power machine operations. For example, cycle time can be controlled based on engine speed (e.g., as discussed above), travel speed of a power machine, angular orientation (i.e., incline) of a power machine, weight or size of payloads being carried by a power machine, or other factors (e.g., operator-specified parameters regarding operation of work elements). In different implementations, cycle time can be controlled based upon any number of combinations of these (or other) parameters. For example, an operator may select a range or exact value for a cycle time for a lift arm, and pump displacement can then be automatically adjusted based on engine speed to maintain the selected cycle time. Further, as the angular inclination of the power machine changes (e.g., due to travel on an incline), as an implement is loaded, or as the speed of the power machine changes, the target cycle time, and the corresponding pump displacement, can then be adjusted accordingly (e.g., to change the cycle time relative to the operator-specified time). Thus, embodiments of the disclosure can enable cycle time to be controlled (e.g., maintained or adjusted) based on any number of parameters related to operation of a power machine.

Figure 2:
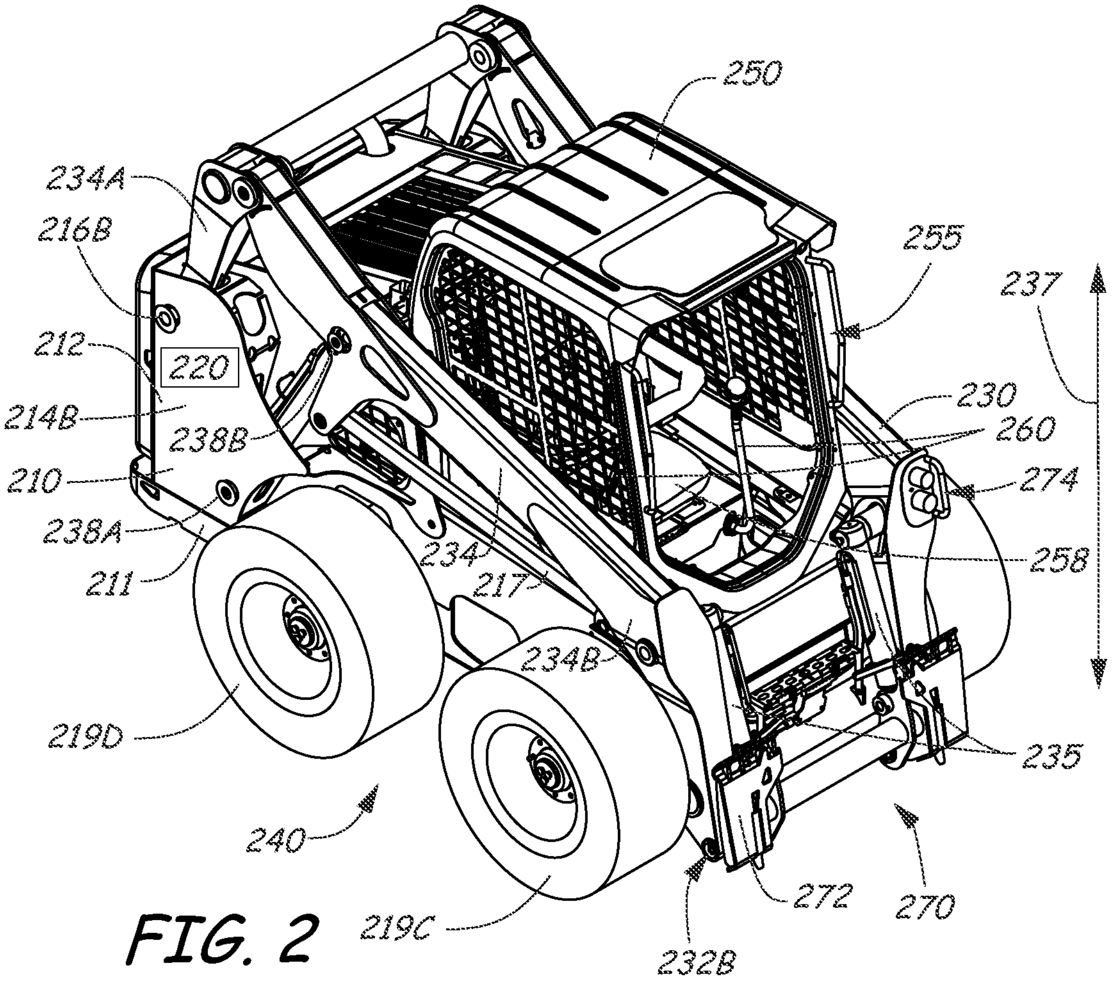
FIGS. 2-3 illustrate perspective views of a representative power machine in the form of a skid-steer loader of the type on which the disclosed embodiments can be practiced.
Figure 3:
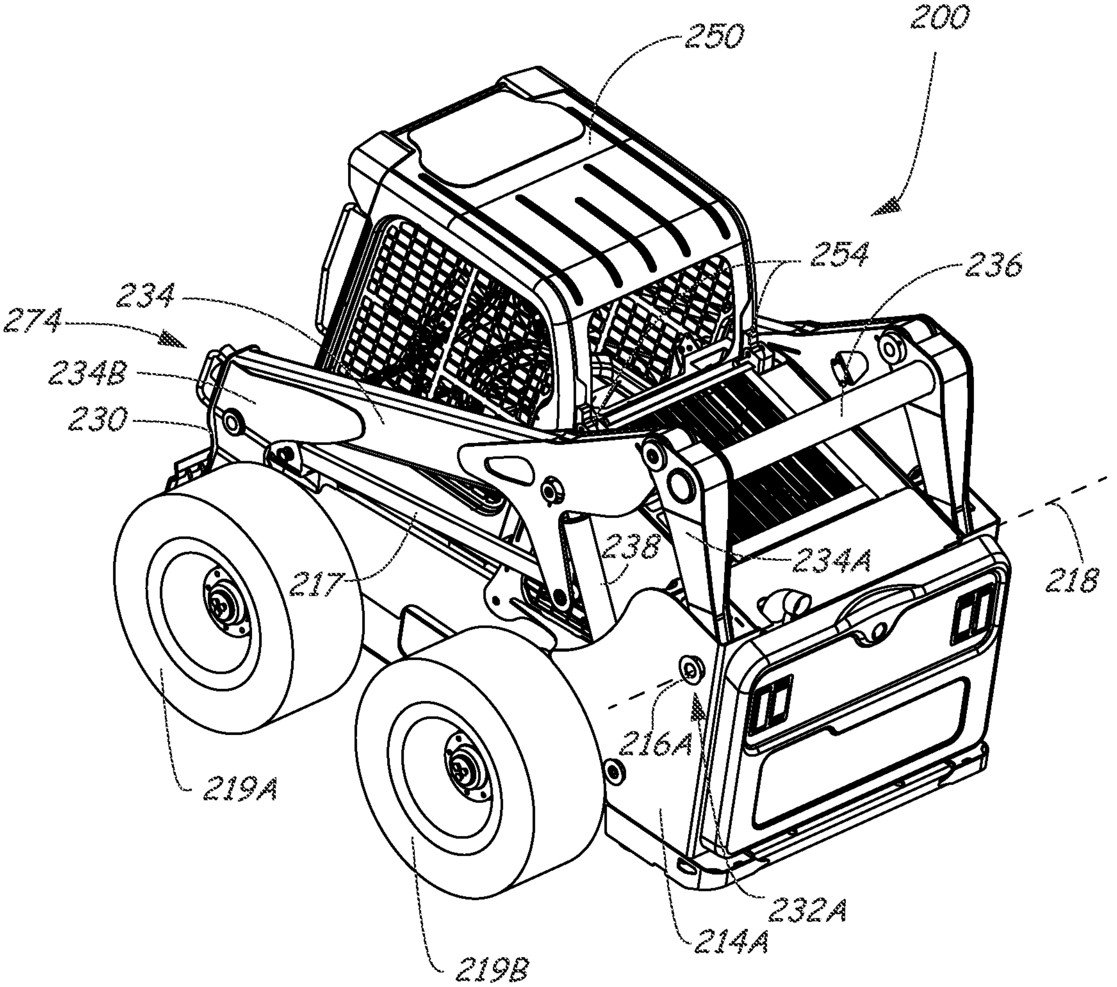

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator-controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions, including non-drive work functions (i.e., work functions other than those provided by the tractive elements 140 or other devices that move the power machine 200 over terrain). Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
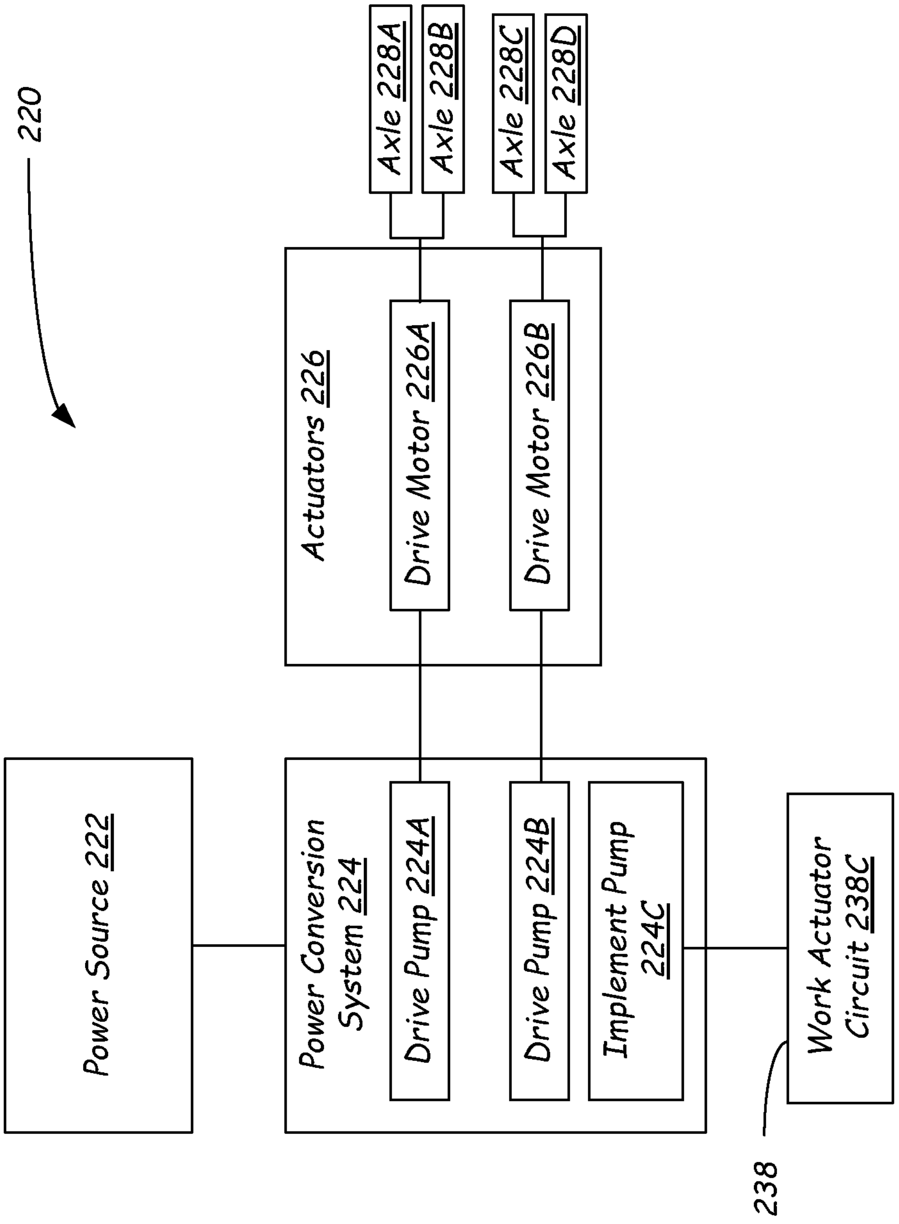
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement. The control logic of power machine 200 includes an open center, 3-spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
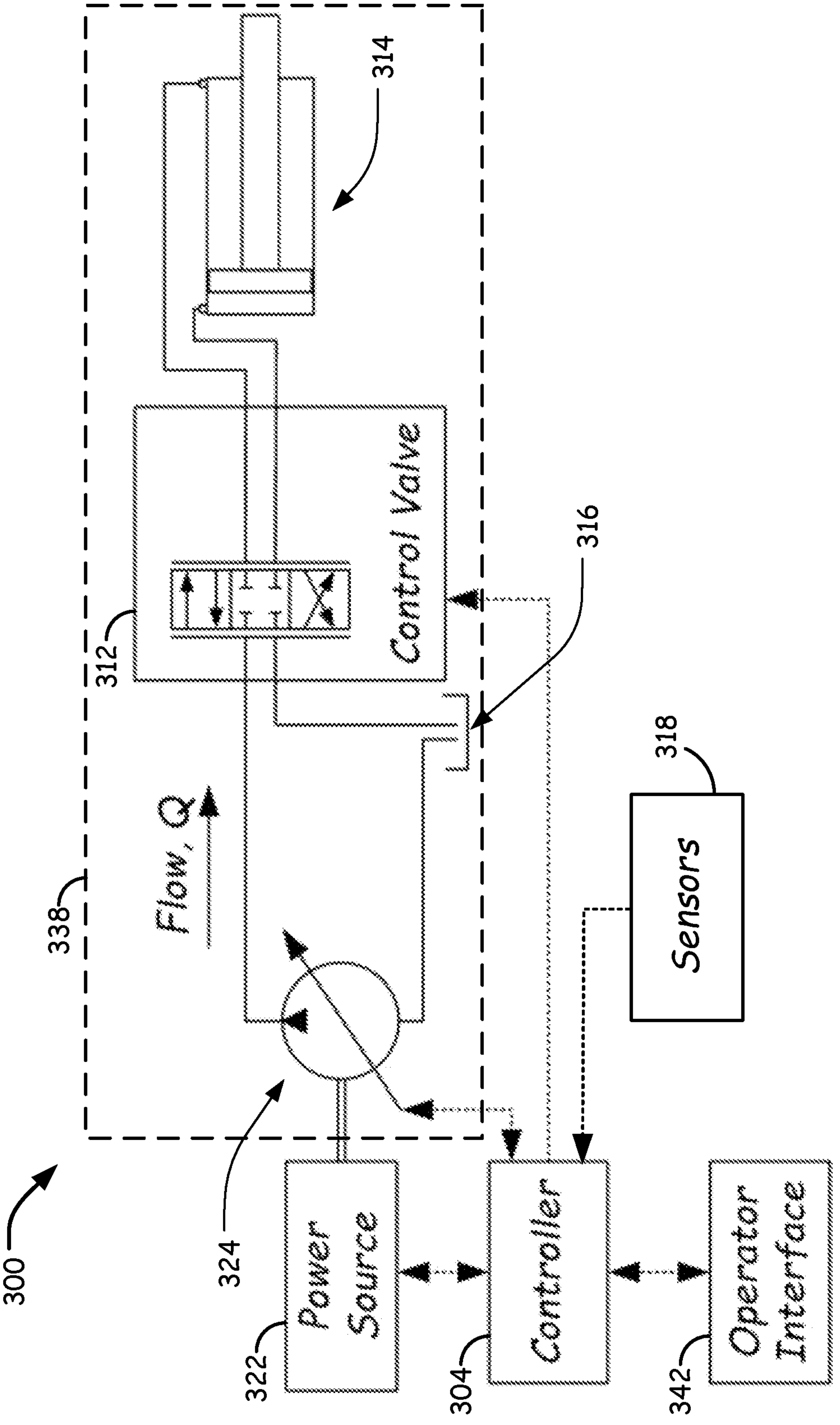
FIG. 5 is a schematic diagram illustrating components of a hydraulic work system for a power machine, such as the loader illustrated in FIGS. 2-3, on which the disclosed embodiments can be practiced.
Figure 6:
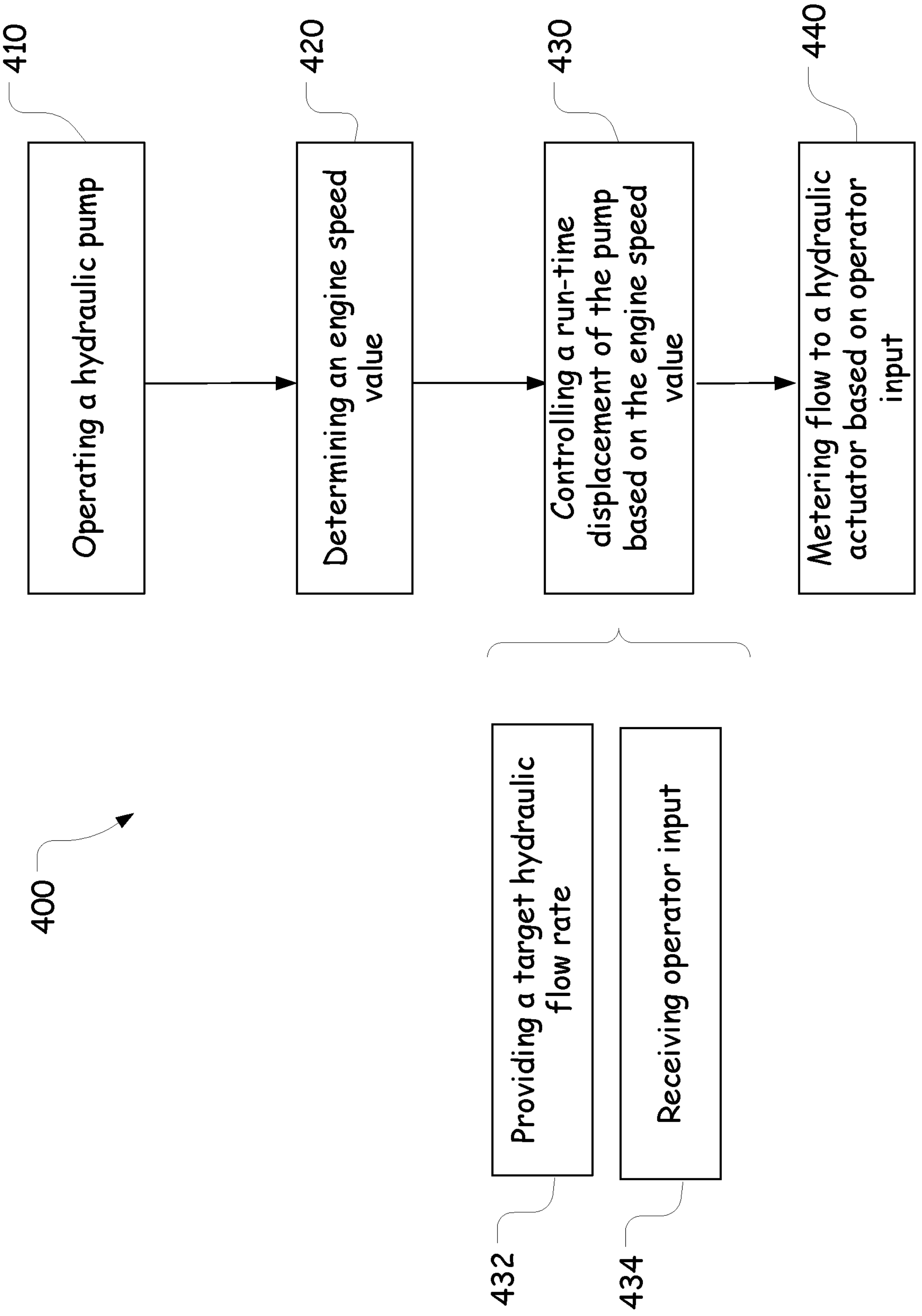
FIG. 6 is a schematic representation of a method for controlling displacement of a hydraulic pump according to some embodiments disclosed herein.

FIG. 5 illustrates a schematic diagram of a hydraulic work system 300 for power machines, according to some embodiments of the present disclosure. As an example, the following description of the hydraulic work system 300 will be discussed with reference to a power machine configured as a loader (e.g., the loader 200). However, the hydraulic work system 300 and other work systems and associated methods according to the disclosure can be implemented on various power machines, including the loader 200 and other power machines of the types described above.

As shown in FIG. 5 the hydraulic work system 300 includes a hydrodynamic work actuator circuit 338 a controller 304, and an operator interface 342. The hydrodynamic work actuator circuit 338 includes a continuously variable displacement hydraulic pump 324 that is powered by a power source 322 (e.g., an engine), a control valve 312, a hydraulic actuator 314, and a reservoir 316. Although particular example operations are discussed below, work actuator circuits can be used for a variety of different operations in different embodiments, including actuation of work elements (e.g., lift arms) or execution of different auxiliary hydraulic operations.

The power source 322 is generally configured to provide power (e.g., rotational power) to the continuously variable displacement hydraulic pump 324. Thus, the power source 322 can be implemented in various forms, including as an electric motor, an internal combustion engine, to name a couple of forms. While other configurations are possible, for purposes of the following description, the power source 322 is configured as a conventional internal combustion engine.

As the power source 322 rotates an input shaft of the hydraulic pump 324, the pump 324 provides a corresponding hydraulic flow Q (e.g., of a hydraulic fluid) to the control valve 312, at a particular hydraulic flow rate. Generally, the hydraulic flow rate can be changed by changing the rotational speed at the input shaft or by changing the displacement of the hydraulic pump 324, such as, for example, by adjusting an angular orientation of a swash plate (not shown) of the hydraulic pump 324 relative to the input shaft. For example, for an axial-piston configuration, when a swash plate is perpendicular to the input shaft, defining a swashplate angle of 0°, the variable displacement pump 324 provides zero hydraulic flow (i.e., Q=0). As the angle between the swash plate and the input shaft increases away from 0°, thus increasing the displacement of the pump 324, the hydraulic flow rate increases. In the illustrated embodiment, the pump 324 is configured only for single-direction flow, from the pump 324 to the control valve 312. In other embodiments, however, bi-directional pumps can be utilized and controlled according to the principles discussed herein.

The hydraulic flow rate from the pump 324 is generally proportional to the displacement of the pump 324 multiplied by the rotational speed of the input shaft (e.g., the engine speed). In conventional systems, the flow rate changes as the rotational speed of the input shaft changes. However, as detailed herein, embodiments of the disclosure can effectively free the hydraulic flow rate of a hydraulic pump from dependence on engine speed, thereby allowing for more effective control of operations powered by the hydraulic flow. Therefore, the flow rate can be maintained at a constant target value (e.g., within a target range) over a wide range of rotational speeds at the input shaft of the pump 324. Accordingly, in some cases, a target cycle time for one or more hydraulic operations (e.g., a target duration for moving a lift arm from a fully lowered to a fully raised position) can be maintained regardless of changes in engine speed. Similarly, in some cases, a target flow rate from a pump to a hydraulic actuator can also be maintained regardless of changes in engine speed.

In different embodiments, different types of flow control devices can be used within a work actuator hydraulic circuit. In the embodiment illustrated, for example, the control valve 312 is configured as a three-position, open-center spool valve, that can selectively provide forward or reversed flow to the hydraulic actuator 314, for powered extension or retraction of the piston of the actuator 314, or route flow from the pump 324 back to the reservoir 316. In other embodiments, a control valve can have a variety of other configurations or can be used in combination with (or replaced by) a variety of other flow control devices.

In some embodiments, a target hydraulic flow rate or a target cycle time may correspond to a valve for control of a hydraulic operation being in a particular state. Further, as appropriate, operator input may selectively place the valve in a different state so that a particular operation may exhibit a different cycle time than the target cycle time or a particular hydraulic actuator may receive a different flow rate than the target flow rate. For example, the control valve 312 is configured to allow an operator, via inputs received at the control device 304, to selectively meter hydraulic flow from the pump 324 to the actuator 314 and thereby controllably vary an actual rate of movement of the actuator 314 for a given flow rate from the pump 324. Accordingly, in some cases, although the displacement of the pump 324 may be controlled based on engine speed to provide a controlled (e.g., constant) flow rate over a range of engine speeds, the actual flow rate at the actuator 314 may vary based on operator input. For example, the pump 324 may be controlled to provide a target (e.g., minimum) cycle time for raising or lowering a lift arm using the actuator 314 with the control valve 312 fully open, but an operator may selectively meter the flow from the pump 324 to the actuator 314 via control of the control valve 312 so that an actual cycle time for the actuator 314 for a particular operation may be different (e.g., slower) than the target cycle time due to the actual flow rate at the actuator 314 being smaller than a target flow rate.

Generally, the hydraulic actuator 314 is intended to represent any of a variety of actuators that can be included in work actuator circuits, for operations related to work elements or other auxiliary hydraulic systems. Different types of actuators can be used within a work actuator hydraulic circuit in different embodiment. Thus, for example, although the hydraulic actuator 314 is illustrated as a single hydraulic cylinder for a lift arm (e.g., a lift or tilt cylinder), one or more other actuators can be used in other embodiments.

To determine appropriate parameters to control operation of relevant components, a controller such as the control device 304 may include various known electrical, hydraulic, and other modules, including electro-hydraulic actuators or other devices, special or general purpose computing devices, and so on. In this regard, for example, the control device 304 may include a processor, a memory, and an input/output circuit that facilitates communication internal and external to the control device 304. The processor may control operation of the control device 304 by executing operating instructions, such as, for example, computer readable program code stored in memory, wherein operations may be initiated internally or externally to the control device 304. The memory may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the control device 304. Although a single control device 304 is described, it will be appreciated that some power systems can include a different number of control devices, including control devices that are distributed about the relevant power machine or located remotely from the power machine.

In the example embodiment illustrated in FIG. 5, the control device 304 is in electrical, hydraulic, or other communication with the hydraulic pump 324, the power source 322, the operator interface 342 (e.g., a joystick, a switch, a button, a touchscreen interface, or any combination of these or other suitable operator interfaces), and the control valve 312. Correspondingly, the control valve 312 can be configured as an electromechanical valve (e.g., a solenoid valve), a hydraulically actuated pilot valve, or in various other known ways. Similarly, the hydraulic pump 324 can be controlled via known types of channels for electronic, hydraulic, or other communication. For example, in some embodiments, the control device 304 can provide to the hydraulic pump 324 a continuous but selectively variable current signal, or other electronic signal, to control the angle of the swash plate of the pump 324. Or the control device 304 can provide hydraulic signals for the same general purpose (e.g., by selectively, hydraulically moving push rods to move the swash plate).

Via the illustrated communication channel (or others) the controller 304 can also receive signals from or send signals to the power source 322. For example, the controller 304 can receive signals over a controller area network ("CAN") bus or other known communication architecture to communicate with any number of sensors that are in communication (e.g., integrated) with the power source 322. In this way, for an example, the controller 304 can interface with a tachometer of an engine to determine the engine speed (e.g., in rpm), with a transmission system that can indicate a gear ratio related to an output shaft that interfaces with the variable displacement pump 324, and so on. As appropriate, the controller 304 can also send signals to the power source 322 to control the operation thereof, such as, for example, to control engine speed or other operational settings.

In the embodiment illustrated, the controller 304 can also receive signals from or send signals to the operator interface 342. The operator interface 342 can embody many different forms or can include many different components. For example, the operator interface 342 can be or include a throttle, a graphical user interface ("GUI"), an actuatable button, and other typical components used in the art. The controller 304 can receive signals from the operator interface 342, which can include for example, signals corresponding to an orientation of a throttle to command a particular travel speed for the power machine, an "on" or "off" state of an actuatable button, or a selection by an operator within a GUI.

In some embodiments, the controller 304 can be in communication with other systems or components. In the illustrated embodiment, the controller 304 is also configured to receive signals from sensors 318 of various types that are distributed about the power machine. For example, one or more of the sensors 318 can be configured as a speed sensor (e.g., rotary encoder) that can provide signals to the controller 304 to support determination of an actual travel speed of a power machine. As another example, one or more of the sensors 318 can be configured as an accelerometer or gyroscope that can provide signals to the controller 304 to support determination of an orientation (e.g., angular inclination) of the power machine or a component thereof, or can be configured as a force or pressure sensor, and so on.

As discussed above, during operation of the power machine (i.e., during run-time) the controller 304 can use information gathered via the various illustrated (or other) communication channels to control the continuously variable displacement of the pump 324 in order to maintain a target flow rate Q. Thus, for example, the controller 304 can maintain a target cycle time for the actuator 314 despite varying speeds of the input shaft of the pump 324 (and of the power source 322).

In some embodiments, the controller 304 can maintain a target hydraulic flow rate, corresponding to a target cycle time of a work element, based on a run-time engine speed. For example, the controller 304 can communicate with sensors of the power source 322 to determine an engine speed value (e.g., an exact engine speed in RPM). Then, depending on the engine speed value, and other relevant parameters (e.g., speed reductions or increases between the power source 322 and the pump 324), the controller 304 can control the displacement of the continuously variable displacement pump 324 to maintain a target hydraulic flow rate (e.g., within a target hydraulic flow rate range). In some embodiments, for example, the controller 304 can automatically adjust a displacement for the pump 324 inversely proportionally to a determined engine speed to beneficially manage cycle time and reduce load on the engine, although other configurations are possible. Thus, for example, a target flow rate or a corresponding target cycle time for an implement or other non-drive system can be generally maintained, despite changes in input speed for the pump 324. This can help to optimize allocation of power to non-drive systems, including at reduced engine speeds, and also help to keep cycle times from becoming too short for effective operation.

In some embodiments, a target flow rate (or, correspondingly, a target cycle time) can be determined based on parameters other than engine speed. For example, in some implementations, an operator can specify a target cycle time (e.g., minimum cycle time or cycle time range) via the operator interface 342 and the controller 304 can adjust displacement of the pump 324 accordingly. For example, an operator can select a desired cycle time (e.g., a cycle time range) via the operator interface 342, such as by specifying a precise cycle time or by selecting more general identifiers such as "fast cycle time," "medium cycle time," or "slow cycle time" that refer to predetermined cycle times. In this regard, it will be understood that identification of cycle time may not necessarily include identifying a particular time value. For example, because cycle time values and speed of movement of relevant actuators are effectively equivalent, some implementations may include determining a cycle time based on a target speed (e.g., a maximum speed of an implement) or in other similar ways. Correspondingly, operator selection of target cycle times can include selection of cycle time values or indicators (e.g., "fast cycle time" as noted above) or can include selection of target implement (or other) speeds.

In other implementations, a target cycle time can be determined in other ways. For example, a target cycle time can be determined via interrogation of look-up tables that include one or more predetermined target cycle time values (e.g., as correspond to a present set of operating conditions) or via calculations using predetermined correlations or other relationships.

As another example, the controller 304 can determine a target flow rate (or cycle time) based on actual travel speed or acceleration of a power machine, such as may be identified based on signals from one or more of the sensors 318. As discussed above, for example, if the power machine is traveling with a particular (e.g., elevated) speed or acceleration, it may help to preserve optimal machine stability and effectiveness if the cycle time of a work element or other system does not fall below a target minimum value (e.g., if the work element or other system does not travel too fast). Thus, based on determining a current travel speed or acceleration, the controller 304 can help to ensure optimally stable run-time operation by controlling displacement of the continuously variable displacement pump 324 to ensure that the cycle time for a particularly system does not fall below a minimum target cycle time.

Similarly, in some embodiments, the controller 304 can determine a target flow rate based on a commanded travel speed of the power machine. For example, an orientation of a throttle control or other device of the operator interface 342 can indicate a commanded travel speed and the controller 304 (or another control system) can control traction elements of the power machine accordingly. Correspondingly, the controller 304 can increase or decrease displacement of the pump 324, depending on whether a decrease or increase of travel speed has been commanded, also to help ensure optimally stable run-time operation.

As another example, in some embodiments, the controller 304 can determine a target flow rate and control displacement of the pump 324 accordingly based on the orientation of the power machine, or the orientation of a component of the power machine. For example, as alluded to above, an accelerometer or gyroscope included in the sensors 318 can communicate with the controller 304 to indicate an angular inclination of a power machine as a whole or a portion thereof (e.g., part of a divided frame), of a lift arm of the power machine (e.g., the lift arm 234), and so on. The controller 304 can then determine an appropriate target flow rate for the pump 324, such as may provide a cycle time that ensures optimal stability (or otherwise optimized performance) for the indicated orientation, and can control the pump 324 accordingly. Thus, for example, when the power machine is inclined relative to horizontal, an implement is extended into a reduced-stability orientation, or a steerable component is steered by a particular degree, a minimum cycle time can be appropriately increased or otherwise moderated. Similarly, in some embodiments, a target flow rate can be determined based on a steering angle of a power machine, such as may be determined by a relative difference in speeds between opposing skid-steer traction elements, regardless of whether a relative physical orientation of a particular component is changed.

As still another example, the controller 304 can determine a target flow rate, and control displacement of the pump 324 accordingly, based on a loading of a work element or implement of a power machine. For example, a force or pressure sensor included in the sensors 318 (e.g., as installed at the hydraulic actuator 314) can communicate with the controller 304 to indicate a weight (or size) of a payload retained or otherwise engaged by a bucket or other implement. The controller 304 can then determine an appropriate target flow rate for the pump 324, such as may provide a cycle time that ensures optimal stability (or otherwise optimized performance) for the operations with the indicated loading and control the pump 324 accordingly. Thus, when the power machine is relatively heavily loaded, a minimum cycle time can be appropriately increased or otherwise moderated.

In some embodiments, a target cycle time (and corresponding flow rate) can be determined based on a characteristic of an implement that is currently attached to a power machine. For example, an operator can select (e.g., via the operator interface 306) a specific implement (e.g., a bucket) or implement type, or a power machine can automatically (e.g., via interfacing sensors) determine the specific implement. The controller 304 can then determine an appropriate cycle time (e.g., a permitted range of cycle times) for that implement, and control flow rate at the pump 324 accordingly.

In some embodiments, flow rate at a pump can be determined based on whether (and how) a particular hydraulic operation is being commanded. For example, the controller 304 can reduce displacement at the pump 324 to zero (or near zero) when no movement is commanded at the actuator 314. Subsequently, when movement of the actuator 314 is commanded, the controller 304 can increase displacement to provide a target flow rate.

In different implementations, an optimal target flow rate (or target cycle time) can be determined based on factors other than those discussed above. For example, predetermined target cycle time (or flow rate) values or corresponding correlations can be used to ensure that implements or other systems can operate with cycle times that are fast enough to be useful, while not being so fast as to unnecessarily decrease instability, result in overly harsh or abrupt movements, or otherwise substantially adversely affect performance of relevant operations. Further, in different implementations, different combinations of any one or more of the factors discussed above (or others) can be used. For example, in some implementations, the controller 304 can determine an initial target flow rate for the pump 324 based on operator input at the operator interface 342, then moderate that flow rate based on sensed values relating to one or more of engine speed, commanded or actual travel speed, orientation of the power machine or an implement thereof, loading of an implement, commanded movement (or non-movement) of the actuator 314, and so on.

In some implementations, devices or systems disclosed herein can be utilized or configured for operation using methods embodying aspects of the invention. Correspondingly, description herein of particular features, capabilities, or intended purposes of a device or system is generally intended to inherently include disclosure of a method of using such features for the intended purposes, a method of implementing such capabilities, and a method of configuring disclosed (or otherwise known) components to support these purposes or capabilities. Similarly, unless otherwise indicated or limited, discussion herein of any method of manufacturing or using a particular device or system, including configuring the device or system for operation, is intended to inherently include disclosure, as embodiments of the invention, of the utilized features and implemented capabilities of such device or system.

Correspondingly, some embodiments can include a method for control of run-time operation of a power machine that includes a hydraulic system with a continuously variable displacement pump that is powered by an engine and is configured to provide hydraulic flow to execute one or more hydraulic work functions. As one example, shown in FIG. 7, a method 400 can include operating 410 a pump of a hydraulic system, using power from an engine of the power machine. In particular, the pump can be operated 410 to provide hydraulic flow to execute hydraulic work functions (e.g., raising and lowering a lift arm) and can be configured to operate with continuously variable displacement to provide the hydraulic flow. To control operation of the pump, an engine speed value can be determined 420, such as by receiving at an electronic control device electronic signals indicating engine speed and using the control device to determine 420 a corresponding engine speed value.

Once an engine speed value has been determined 420, a run-time displacement of the pump can then be controlled

430 accordingly. For example, a run-time displacement of a pump can be controlled 430 based on engine speed (e.g., increased or decreased inversely to engine speed) to provide 432 a target flow rate from the pump for hydraulic work functions or to ensure that a target (e.g. minimum) cycle time for a hydraulic work function can be maintained. As noted above, in some cases, a target cycle time can thus be maintained for an operation to raise (or lower) a lift arm between a fully lowered configuration and a fully raised configuration, although cycle times for other work functions can be similarly controlled. In some embodiments, a target flow rate can be a target total flow rate or can be a target flow rate range.

In some embodiments, pump displacement can be controlled 430 automatically. In some embodiments, operator input may be provided. For example, in some implementations, operator input can be received 434 in order to specify a target (e.g., target minimum) cycle time or a target (e.g., target maximum) flow rate, and run-time displacement of the pump can be controlled 430 accordingly, with corresponding control 430 of pump displacement as engine speed changes. As also discussed above, a received 434 operator input may not necessarily indicate an absolute target flow rate or cycle time, but may sometimes instead indicate a more general parameter, such as a "high," "medium," or "low" flow rate or cycle time.

In some cases, operator input may affect actual cycle time or flow rate in other ways. In some implementations of the method 400 may include metering 440 flow from the operated 410 pump to a hydraulic actuator based on operator input. For example, although a pump may be controlled 430 in order to enable a target cycle time or to provide a target flow rate, operator input may sometimes indicate a different desired actual cycle time or flow rate (or, more generally, a different desired speed for a work operation). In such a case, flow to the relevant hydraulic actuator can then be metered 440 appropriately, such as through electronic or hydraulic control of a control valve that can increase or decrease the available flow from a controlled 430 pump to a particular hydraulic actuator.

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a control device such as a processor device, a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a control device such as an automation device, a special purpose or general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the invention, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Although the present invention has been described by referring preferred embodiments, workers skilled in the art will recognize that changes may be made in form and detail without departing from the scope of the discussion.

What is claimed is:

1. A power machine comprising: a frame;

a lift arm pivotally mounted to the frame; a power source coupled to the frame;

a hydraulic actuator coupled to the frame and to the lift arm and actuable to move the lift arm relative to the frame;

a hydraulic system including a pump in communication with the hydraulic actuator, the pump configured to be powered by the power source with an input speed, to provide a hydraulic flow to the hydraulic actuator; and a control device in communication with the pump and configured to:

determine the input speed; and in response to an operator input that commands movement of the lift arm, control a run-time displacement of the pump based on the determined input speed, to maintain a predetermined target pump flow rate from the pump that causes the hydraulic actuator to move the lift arm between a fully lowered position and a fully raised position with a target run-time lift speed that corresponds to the predetermined target pump flow rate.

2. The power machine of claim 1, wherein the power source is an electrical power source.

3. The power machine of claim 2, wherein the power source includes an electric motor.

4. The power machine of claim 1, wherein the pump is configured to operate with continuously variable run-time displacement.

5. The power machine of claim 1, wherein the control device is configured to control the run-time displacement, based on the determined input speed, in response to the operator input commanding movement of the lift arm at a commanded lift speed that is greater than the target run-time lift speed.

6. The power machine of claim 1, further comprising:

a valve in communication with the pump and the hydraulic actuator and moveable to meter flow between the pump and the hydraulic actuator;

wherein the target run-time lift speed corresponds to the valve being fully opened.

7. The power machine of claim 1, wherein the predetermined target pump flow rate from the pump causes the hydraulic actuator to move the lift arm from the fully lowered position to the fully raised position in a predetermined target duration of time.

8. The power machine of claim 7, wherein the control device is configured to control the run-time displacement based on an operator input that indicates the predetermined target duration of time.

9. The power machine of claim 1, wherein the control device is further configured to control the run-time displacement of the pump based on one or more of a sensed orientation of the power machine relative to gravity or a sensed loading of an implement supported by the lift arm.

10. The power machine of claim 1, wherein the control device is further configured to control the run-time displacement of the pump based on a travel speed or acceleration of the power machine.

11. A method for controlling operation of a power machine, the method comprising: operating a pump of a hydraulic system, using power from a power source of the power machine;

determining, using a control device, a power source speed that powers the pump;

controlling, using the control device, a variable run-time displacement of the pump, based on the determined power source speed, to provide hydraulic flow for hydraulic work functions;

receiving, at the control device, operator inputs to control execution of at least one of the hydraulic work functions; and with the power source providing the determined power source speed, during the execution of the at least one hydraulic work function, and in response to a range of operator inputs that correspond to a range of cycle times for the at least one of the hydraulic work functions, controlling the run-time displacement of the pump to provide a target constant hydraulic flow rate that corresponds to the determined power source speed.

12. The method of claim 11, wherein the target hydraulic flow rate corresponds to a target minimum cycle time for the at least one of the hydraulic work functions.

13. The method of claim 12, further comprising:

determining the target minimum cycle time, using the control device, based on a run-time operator input.

14. The method of claim 12, wherein the at least one of the hydraulic work functions includes moving a lift arm of the power machine from a fully lowered position to a fully raised position.

15. The method of claim 11, further comprising:

during the execution of the at least one of the hydraulic work functions, and with the pump providing the target constant hydraulic flow, controlling a valve to reduce flow for execution of the at least one of the hydraulic work functions to below the target constant hydraulic flow rate.

16. The method of claim 11, wherein the power source includes an electric motor that powers rotation of the pump.

17. A hydraulic work system for use in a power machine with a power source, the hydraulic work system comprising:

a hydrodynamic work actuator circuit that includes an implement pump that is configured to provide hydraulic flow to execute hydraulic work functions, the implement pump being powered by the power source and being configured to operate with continuously variable displacement to provide the hydraulic flow; and a control device that is configured to:

determine a target maximum hydraulic flow rate of the implement pump for execution of at least one of the hydraulic work functions;

determine an input speed value of the power source that powers the implement pump;

receive an operator input to control execution of the at least one of the hydraulic work functions with a commanded cycle time; and control a run-time displacement of the implement pump based on the determined input speed value, over a range of input speed values, to prevent a run-time flow rate of the implement pump from exceeding the target maximum hydraulic flow rate during execution of at least one of the hydraulic work functions, the maximum hydraulic flow rate corresponding to a cycle time for the at least one of the hydraulic work functions that is lower than the commanded cycle time.

18. The hydraulic work system of claim 17, wherein the target maximum hydraulic flow rate corresponds to a target minimum cycle time for the at least one of the hydraulic work functions.

19. The hydraulic work system of claim 18, wherein the at least one of the hydraulic work functions includes moving a lift arm of the power machine; and wherein the target minimum cycle time is a cycle time for moving the lift arm from between a fully lowered position and a fully raised position.

20. The hydraulic work system of claim 19, further comprising:

a valve in communication with the implement pump and a hydraulic actuator configured to execute the at least one of the hydraulic work functions, the valve being controllable, based on the operator input, to meter flow between the implement pump and the hydraulic actuator;

wherein the target minimum cycle time corresponds to operation of the hydrodynamic work actuator circuit with the valve fully opened.

* * * * *